United States Patent
Lukyanenko et al.

(10) Patent No.: US 12,079,169 B2
(45) Date of Patent: Sep. 3, 2024

(54) SCALABLE MESSAGING FRAMEWORK FOR PROVIDING MACHINE LEARNING SERVICES ACROSS MULTIPLE AVAILABILITY ZONES

(71) Applicant: PAYPAL, INC., San Jose, CA (US)

(72) Inventors: Nikita Alekseyevich Lukyanenko, San Jose, CA (US); Alexander Shvid, Las Vegas, NV (US)

(73) Assignee: PAYPAL, INC., San Jose, CA (US)

( * ) Notice: Subject to any disclaimer, the term of this patent is extended or adjusted under 35 U.S.C. 154(b) by 278 days.

(21) Appl. No.: 17/493,497

(22) Filed: Oct. 4, 2021

(65) Prior Publication Data
US 2023/0105375 A1  Apr. 6, 2023

(51) Int. Cl.
G06F 16/176 (2019.01)
G06F 9/54 (2006.01)

(52) U.S. Cl.
CPC ............ G06F 16/176 (2019.01); G06F 9/546 (2013.01)

(58) Field of Classification Search
CPC ..................................... G06F 16/176
See application file for complete search history.

(56) References Cited

U.S. PATENT DOCUMENTS

| | | | | |
|---|---|---|---|---|
| 7,406,596 B2* | 7/2008 | Tararukhina | .......... | H04L 69/328 713/165 |
| 10,673,971 B1* | 6/2020 | Hindanov | ............... | H04L 67/60 |
| 2003/0120593 A1* | 6/2003 | Bansal | ................. | H04L 65/765 705/36 R |
| 2004/0030894 A1* | 2/2004 | Labrou | ................. | G06Q 20/02 713/168 |
| 2020/0004564 A1* | 1/2020 | Calegari | ................. | G06F 9/453 |

* cited by examiner

*Primary Examiner* — Grace Park
(74) *Attorney, Agent, or Firm* — Haynes and Boone, LLP

(57) ABSTRACT

Methods and systems are presented for providing an asynchronous communication system for facilitating computing services to computer nodes across multiple availability zones. Each computer node includes a client application configured to receive a service request and to generate a request file based on the service request. The client application uploads the request file to a folder hosted by a file sharing system and shared with a processing server. When a new request file is detected in the folder, the processing server downloads the request file from the file sharing system. Based on performing one or more computing services according to the request file, the processing server generates a response file including output data from the computing services. The processing server uploads the response file to the folder hosted by the file sharing system. The client application downloads the response file and presents the output data on a device.

20 Claims, 8 Drawing Sheets

```
message DialogSyncRequest {
    string          tenant = 1;
    ComplaintChannel channel = 2;
    string          request_id = 3;    // UUID generated by dialogsync
    int32           num_samples = 4;
    string          start_date = 5;    // YYYY-MM-DD
    string          end_date = 6;      // YYYY-MM-DD
    string          selection_type = 7;  // random, threshold, upheld, second_review, primary_ids, batch
    string          agent = 8;         // username of reviewing user
    repeated string countries = 9;    // US, UK (if empty no filter)
    repeated string languages = 10;   // en (if empty no filter)
    repeated string primary_ids = 11; // for primary_ids selection model
    string          selection_batch = 12; // selection batch name
}
```

Figure 5

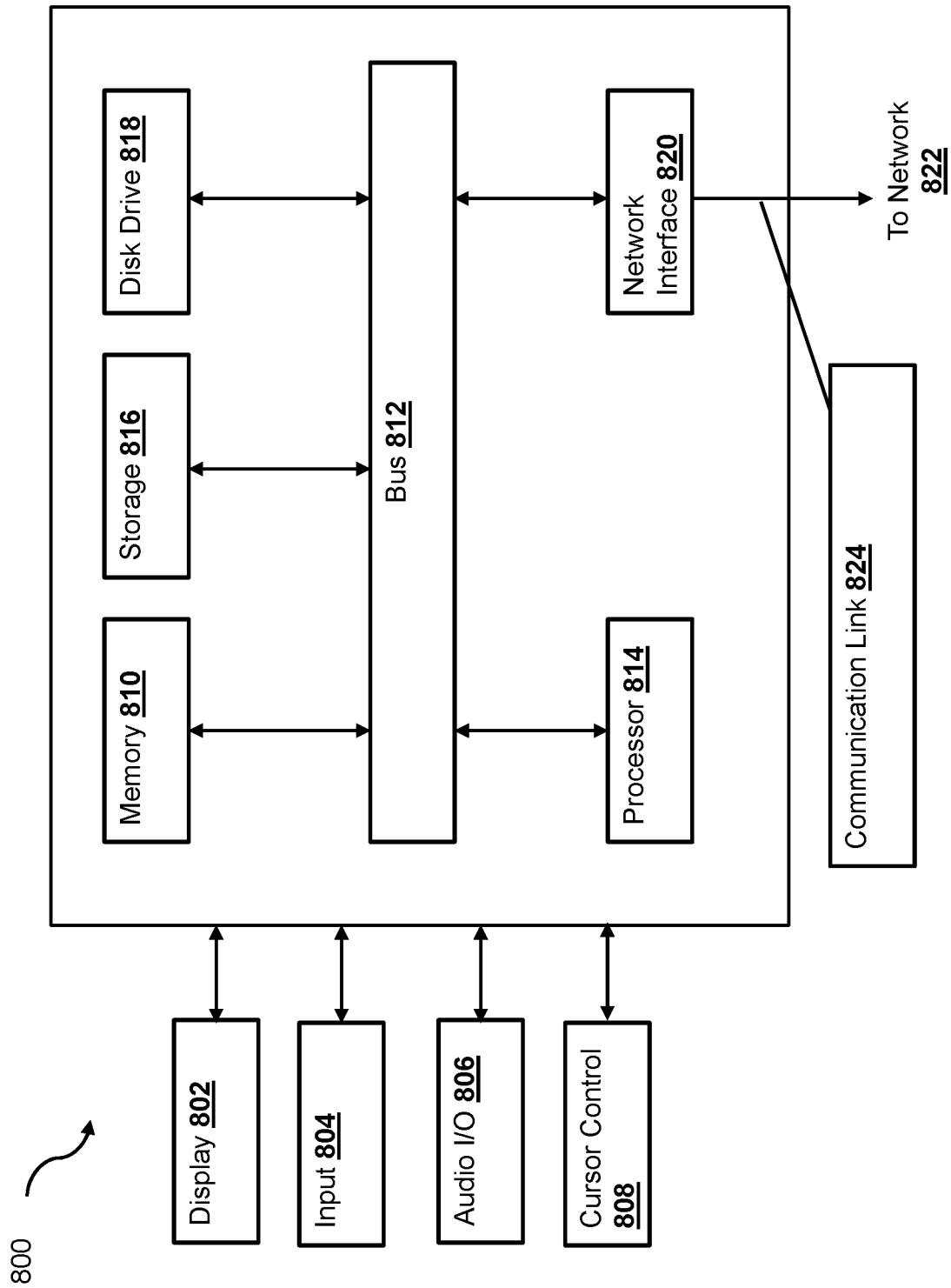

SCALABLE MESSAGING FRAMEWORK FOR PROVIDING MACHINE LEARNING SERVICES ACROSS MULTIPLE AVAILABILITY ZONES

BACKGROUND

The present specification generally relates to remote computing, and more specifically, to providing a scalable communication framework for facilitating computer services to remote computer nodes according to various embodiments of the disclosure.

RELATED ART

The interconnectedness of devices enables remote services to be provided to devices that cannot otherwise access such services for a variety of reasons. For example, certain computing services may require a large amount of computer processing power that can only be performed by specialized machines such as supercomputers. Due to the cost and size of such specialized machines, the computing services may only be performed by a limited number of devices and at a limited number of locations. As such, in order to make the computing services widely available, each provider of such computing services may be required to service requests from a large number of devices across multiple regions.

To exacerbate the problem, due to the complexity of the computing services, the time to service each request may be substantially long. It is, therefore, a challenge to provide these types of computing services to a large number of devices across different locations. Thus, there is a need for a scalable framework that provides complex computing services to devices across multiple regions.

BRIEF DESCRIPTION OF THE FIGURES

FIG. 5 illustrates an example request message according to an embodiment of the present disclosure;

FIG. 8 is a block diagram of a system for implementing a device according to an embodiment of the present disclosure.

Figure 1:
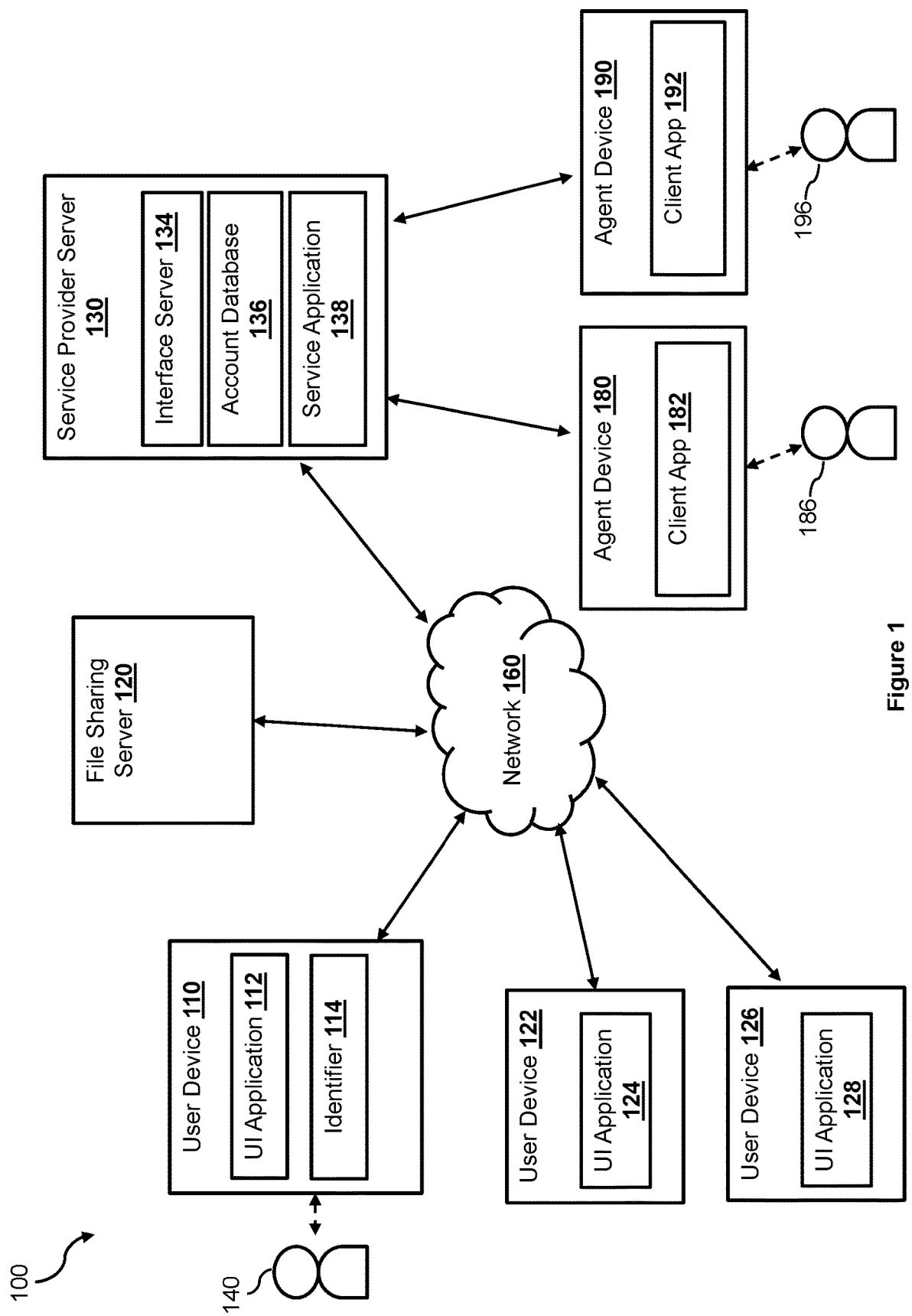
FIG. 1 is a block diagram illustrating a networked system that includes an electronic transaction system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure includes methods and systems for providing a scalable communication framework for facilitating computing services to computer nodes across multiple availability zones of an organization (e.g., a service provider). As discussed above, it is a challenge to provide computing services remotely to different computer nodes (devices or servers that access the computing services), especially when the computing services are provided to computer nodes across multiple networks and geographical regions (e.g., multiple availability zones). Each availability zone may be associated with a particular geographical region and devices within the availability zone are protected behind a firewall. For example, the processing server that is configured to provide the computing service is likely located deep within a data center network for security reasons. On the other hand, computer nodes configured to provide an interface to user devices through front-end applications (e.g., web servers, application servers, etc.) are located close (distance-wise or connectivity-wise) to the user devices across different networks and/or geographical regions.

Conventionally, the processing server configured to provide the computing services may use synchronous communication sessions such as a Transmission Control Protocol (TCP)/Internet Protocol (IP) communication session to communicate with computer nodes requesting the computing services over a computer network (e.g., the Internet, etc.). However, maintaining such synchronous communication sessions can require a substantial amount of processing power from the processing server, which may take away processing power from the processing server to perform the computing services or other computing services. Alternatively, a separate server (e.g., a web server) may be provided to provide such synchronous communication sessions between the processing server and the computer nodes, but such a solution increases both the cost and complexity of a communication framework. Furthermore, the computing services provided by the processing server may be complex and may require a substantial amount of time to perform. In some cases, response data from the processing server may be substantially large (e.g., several hundreds or thousands of files, etc.) which may require a substantial amount of time to transmit to the computer nodes over a network. Examples of such computing services may include machine learning and modeling, retrieval of a large amount of data from one or more data sources, etc. Thus, when multiple computing nodes are requesting the computing services, the processing server (or a separate server) may be required to simultaneously maintain a large number of synchronous communication sessions while the computing services are being processed. The maintenance of the large number of synchronous communication sessions with the computer nodes may substantially degrade the speed and efficiency performance of the processing server in performing the computing services.

Thus, according to various embodiments of the disclosure, an asynchronous communication system may facilitate communications between the processing server and the computer nodes in an asynchronous manner such that no communication sessions are required to be maintained between the processing server and the computer nodes. Through the asynchronous communication system, requests for computing services may be transmitted from the computer nodes to the processing server, and responses may be transmitted from the processing server to the computer nodes in a secured and asynchronous manner. In some embodiments, a file sharing system (e.g., an online file sharing system, etc.) may be utilized by the asynchronous communication system to facilitate the communications between the processing server and the computer nodes. The asynchronous communication system may include a client application (e.g., a desktop application, a mobile application, etc.) that can be provided to each of the computer nodes configured to request the computing services. The asynchronous communication system may also include a server application provided to the processing server.

In some embodiments, the file sharing system is part of the asynchronous communication system. In some embodiments, the file sharing system is a third-party online file sharing system (e.g., Dropzone® file sharing system, Dropbox® file sharing system, Box® file sharing system, GoogleDocs® file sharing system, etc.) that has been utilized by the organization to facilitate file sharing among its agents. The file sharing system may be configured to communicate with the client applications and/or the server application via a file transfer protocol, such as a Secured File Transfer Protocol (SFTP). The file sharing system may also host a file structure that may include one or more folders according to a file structure hierarchy (e.g., a folder hierarchy). Files can be uploaded, shared, and downloaded by different devices through their respective accounts with the file sharing system.

In some embodiments, the server application may establish an account with the file sharing system. By establishing the account with the file sharing system, the server application may access certain services provided by the file sharing system, such as creating a folder that is shared between the account of the server application and one or more other accounts (e.g., accounts of various client applications), uploading one or more files to the file sharing system, and/or downloading files from the file sharing system.

Each client application, after being installed in a corresponding computer node, may be configured to communicate with the file sharing system. In some embodiments, each client application may also establish a respective account with the file sharing system, through which the client application may access the services provided by the file sharing system, such as creating one or more folders to be shared with other accounts, uploading files to the file sharing system, and/or downloading files from the file sharing system. In some embodiments, each client application, upon having been installed on a corresponding computer node, may be configured to communicate with the server application (e.g., via the Internet Protocol without passing through the file sharing system, etc.) to notify the server application of its existence. The communication may include an identifier of the account of the client application. This way, the server application may create a record of all of the client applications that may transmit requests for computing services to the processing server.

The server application may, through its account with the file sharing system, create one or more folders on the file sharing system. The server application may also share the one or more folders with the accounts of the client application, such that the server application and each client application that has been registered with the server application (e.g., providing an account identifier to the server application) may access the one or more folders. When the server application receives a notification of a new client application being installed on a computer node, the server application may be configured to grant the account of the new client application access to the one or more folders. This way, the server application and all of the client applications may share files via the one or more folders hosted by the file sharing system. In some embodiments, the asynchronous communication system facilitates communications between the processing server and the computer nodes based on the sharing of files via the file sharing system.

In some embodiments, each client application may generate a corresponding pair of a public key and a private key, and may upload the public key to a folder of the one or more folders hosted by the file sharing system. By uploading the public key to the file sharing system, the client application shares the public key with other accounts (e.g., accounts of the server application, accounts of other instances of the client application, etc.) such that those other applications may use the public key to encrypt data when communicating with the client application. In some embodiments, each client application may also possess the public key of the server application (e.g., downloading from the file sharing system, included in the client application, etc.), for use to encrypt data to be transmitted to the server application.

When a computer node (or a user of the computer node) requires the computing services, the client application installed in the computer node may generate a request file comprising a request for the computing service. In some embodiments, each client application may be configured to provide a user interface on the corresponding computer node to interact with a user of the corresponding computer node. The user interface may receive inputs from the user of the computer node. In some embodiments, through the user interface of the client application, the user of the computer node may initiate a request for the computing services. The client application may then receive, via the user interface, parameters for the computing services requested by the user. Based on the parameters received via the user interface, the client application may generate a request file.

The request file may include an identifier of the client application (e.g., an account identifier of the account with the file sharing system, etc.) and the one or more parameters associated with the request for computing services. The request file may be in any one of the formats that is readable by the service application (e.g., a text file in JSON format, etc.). The client application may encrypt at least a portion of the request file using the public key associated with the server application and may then upload the encrypted request file to one of the one or more folders hosted by the file sharing system via SFTP through its account.

In some embodiments, the server application may be configured to, through its account, monitor the one or more folders hosted by the file sharing system for request files. When a new request file is detected in the one or more folders, the server application may download the request file to the processing server via SFTP through its account, and may delete the request file from the file sharing system. If the request file was encrypted using the public key of the server application, the server application may decrypt the request file using a corresponding private date associated with the server application. The processing server may perform the computing services based on the one or more parameters included in the request file.

The processing server may generate response data based on performing the computing services. For example, the computing services may include analyzing data (e.g., retrieved or generated based on the parameters) to produce an output using one or more machine learning models. In another example, the computing services may include retrieving data based on the parameters in the request file. Thus, the server application may be configured to generate a response file for the request from the computer node. The response file may include the identity of the client application that submitted the corresponding request file and any output data based on performing the computing services. In some embodiments, the server application may retrieve, from the file sharing system through the account of the server application, a public key associated with the client application that generated the corresponding request file based on the identity of the client application. The server application may encrypt at least a portion of the response file (e.g., the response file excluding the identity of the client application) and may upload the encrypted response file to one of the one or more folders hosted by the file sharing system. If the output is too large (e.g., exceeding a threshold size), the server application may generate multiple response files using the techniques described herein and upload the multiple response files to the one or more folders hosted by the file sharing system.

In some embodiments, each client application may also be configured to monitor the one or more folders hosted by the file sharing system for any new response files. When a new response file is detected in the one or more folder, the client application may determine whether the response file is for that client application based on the identifier (which is not encrypted) in the response file. If it is determined that the response file is for that client application, the client application may download the response file from the file sharing system, via SFTP through the account of the client application, to the corresponding computer node, and may delete the response file from the file sharing system. The client application may decrypt the response file using the private key associated with the client application, and may extract the output data from the response file. The client application may then provide the computer node with the output data. For example, the client application may present the output data on a display of the computer node.

Using the techniques described herein, the file sharing system is leveraged to facilitate communications between the processing server and the computer nodes efficiently and securely even when the computer nodes are located across different availability zones of the organization. By uploading, downloading, and deleting request files and response files, the file sharing system is utilized as a messaging queue service for the processing server and the computer nodes without requiring any additional computer components. The requests and responses are transmitted between the processing server and the computer nodes securely and efficiently. Since each request file and response file is encrypted using the public key of a recipient account, the files can remain confidential even though they are temporarily stored in the file sharing system. The transmission of the request files and response files between the file sharing system and the applications are also secured based on the secured file transfer protocol. Furthermore, the transmissions of the request files and response files, even when the file sizes are large, do not overwhelm the processing server and/or the computer nodes as the processing server and/or the computer nodes can manage how and when the files are downloaded and processed.

FIG. 1 illustrates a networked system 100, within which the asynchronous communication system may be implemented according to one embodiment of the disclosure. Note that the present techniques may be applied in many different computing and technological environments, however, and are not limited to those shown in the figures. The networked system 100 includes a service provider server 130 configured to interface with user devices 110, 122, and 126 via a network 160, and a file sharing server 120. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by a user 140 to interact with the service provider server 130 over the network 160. The user 140 may be a natural person or an entity (e.g., a corporation, a partnership, an organization, etc.). For example, the user 140 may use the user device 110 to conduct an online transaction with the service provider server 130 via websites hosted by, or mobile applications associated with, the service provider server 130. The user 140 may also log in to a user account to access account services or conduct electronic transactions (e.g., fund transfers, payments, purchase transactions, data access transactions, etc.) with the service provider server 130. The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface (UI) application 112 (e.g., a web browser, a mobile application, etc.), which may be utilized by the user 140 to interact with the service provider server 130 over the network 160. In one implementation, the UI application 112 includes a software program (e.g., a mobile application) that provides a graphical user interface (GUI) for the user 140 to interface and communicate with the service provider server 130 via the network 160. In another implementation, the UI application 112 includes a browser module that provides a network interface to browse information available over the network 160. For example, the UI application 112 may be implemented, in part, as a web browser to view information available over the network 160.

The user device 110, in one embodiment, may include at least one identifier 114, which may be implemented, for example, as operating system registry entries, cookies associated with the UI application 112, identifiers associated with hardware of the user device 110 (e.g., a media control access (MAC) address), or various other appropriate identifiers. In various implementations, the identifier 114 may be passed with a user login request to the service provider server 130 via the network 160, and the identifier 114 may be used by the service provider server 130 to associate the user 140 with a particular user account (e.g., and a particular profile) maintained by the service provider server 130.

In various implementations, the user 140 is able to input data and information into an input component (e.g., a keyboard) of the user device 110. For example, the user 140 may use the input component to interact with the UI application 112.

Each of the user devices 122 and 126 may be implemented in a similar manner as the user device 110. For example, each of the user devices 122 and 126 may be operated by a user (e.g., the same or a different user from the user 140) to interact with other devices, such as the service provider server 130 via the network 160, using UI applications 124 and 128, respectively. Furthermore, each of the user devices 122 and 126 may include a respective user identifier, which may be passed to the service provider server 130 so that the service provider server may identify a particular user account for the user of the user devices 122 and 126. While only three user devices 110, 122, and 126 are shown in FIG. 1, it has been contemplated that additional user devices, each associated with a different user account, may be connected to the service provider server 130 via the network 160.

In some embodiments, the file sharing server 120 may implement the file sharing system as disclosed herein. As such, the file sharing server 120 may provide file hosting and sharing services for its users. The file sharing server 120 may include one or more data storages (which may be located in one or more different servers across one or more different geographical regions) for storing files associated with different entities. The file sharing server 120 may enable different entities to establish an account with the file sharing server 120. Through the accounts with the file sharing server 120, the entities may create one or more folders within a file structure hosted by the file sharing server 120. An entity, through an account with the file sharing server 120, may configure the one or more folders to be sharable with one or more other accounts with the file sharing server 120, such that the entity and one or more other entities may access the one or more folders and files stored within the one or more folders in the file sharing server 120.

As such, the entity may upload files to the one or more folders of the file sharing server 120 via a file transfer protocol such as SFTP, and also download files from the one or more folders of the file sharing server 120 via the file transfer protocol. The files may be stored in the one or more data storages. In some embodiments, the files may be duplicated across multiple data storages for redundancy to ensure that the files are always available to the entities.

In one example, the service provider server 130 may be maintained by a transaction processing entity or an online service provider, which may provide processing for electronic transactions between the users of the user device 110 and one or more merchants or other types of payees. It is noted that the service provider server 130 may be, in other examples, associated with other service providers, such as a data storage provider, a banking institute, or an e-commerce provider (e.g., an online retailer, etc.). In the example where the service provider server 130 is maintained by a transaction processing entity, the service provider server 130 may include a service application 138, which may be adapted to interact with the user devices 110, 122, and 126 over the network 160 to facilitate the searching, selection, purchase, payment of items, fund transfers, transaction authentication, and/or other services offered by the service provider server 130. In one example, the service provider server 130 may be provided by PayPal®, Inc., of San Jose, California, USA, and/or one or more service entities or a respective intermediary that may provide multiple point of sale devices at various locations to facilitate transaction routings between merchants and, for example, service entities.

In some embodiments, the service application 138 may include a payment processing application (not shown) for processing purchases and/or payments for electronic transactions between a user and a merchant or between any two entities (e.g., between two users, etc.). In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds.

The service provider server 130 may also include an interface server 134 that is configured to serve content (e.g., web content) to users and interact with users. For example, the interface server 134 may include a web server configured to serve web content in response to HTTP requests. In another example, the interface server 134 may include an application server configured to interact with a corresponding application (e.g., a service provider mobile application) installed on the user devices 110, 122, and 126 via one or more protocols (e.g., RESTAPI, SOAP, etc.). As such, the interface server 134 may include pre-generated electronic content ready to be served to users. For example, the interface server 134 may store a log-in page and is configured to serve the log-in page to users for logging into user accounts of the users to access various services provided by the service provider server 130. The interface server 134 may also include other electronic pages associated with the different services (e.g., electronic transaction services, etc.) offered by the service provider server 130. As a result, a user (e.g., the user 140, users of the user devices 122 and 126, etc.) may access a user account associated with the user and access various services offered by the service provider server 130 (e.g., conduct various transactions such as payment transactions, data access transactions through a user account of the user), by generating HTTP requests directed at the service provider server 130.

The service provider server 130, in one embodiment, may be configured to maintain one or more user accounts in an account database 136, each of which may be associated with a profile and may include account information associated with one or more individual users (e.g., the user 140 associated with user device 110, etc.). In one implementation, a user may have credentials to authenticate or verify identity with the service provider server 130. Thus, the service provider server may store the credentials of the users in corresponding records of the account database 136 associated with the user accounts.

In some embodiments, in order to provide services to the user devices 110, 122, and 126, the service provider may provide structured and/or unstructured communications (e.g., text, verbal, etc.) with the users, via agent devices 180 and 190. The agent devices 180 and 190 include a client application 182 and a client application 192, respectively, which implement at least a portion of the asynchronous communication system as discussed herein. The client applications 182 and 192 are configured to facilitate communications between the agent devices 180 and 190 (e.g., the computer nodes) and a remote processing server (not shown) configured to perform certain computing services. Through the client applications 182 and 192, agents 186 and 196 (which can be a human agent or a chatbot) may transmit requests for computing services to the remote processing serer and receive responses from the remote processing server via the file sharing server 120.

For example, the agent 186 of the service provider may conduct a communication session (e.g., a chat session, a phone call, etc.) with a user. While providing services to the user during the communication session, an agent may request certain computing services (e.g., requesting a summary of one or more previous communication session with the same user, etc.) associated with the remote processing server. In this example, the agent 186 may transmit a request for the computing services to the remote processing server through the client application 182. In another example, the agent 196 may assist in labeling certain data (e.g., labeling communication during a previous recorded communication session with a user, etc.) for the service provider. Through the client application 192, the agent 196 may request data to be labeled from the remote processing server. The client applications 182 and 192 may be configured to transmit the request to the remote processing server with the use of the file sharing server 120 (e.g., by uploading request files to the file sharing server 120). The client applications 182 and 192 may also be configured to receive responses from the remote processing server by downloading response files from the file sharing server 120. Upon receiving the responses, the client applications 182 and 192 may present the respective responses via their respective user interfaces, such that the agents 186 and 196 have access to the response data.

Figure 2:
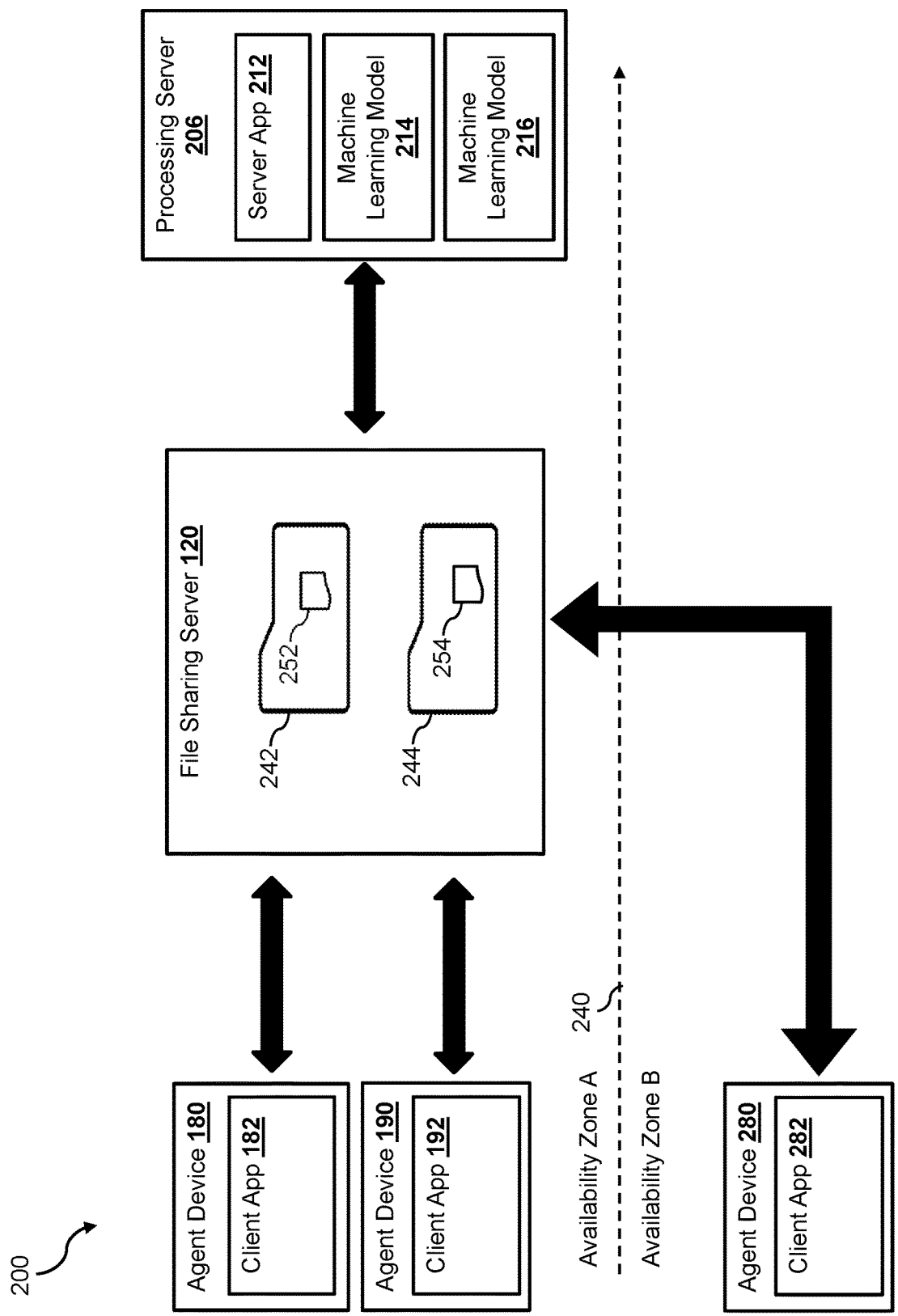
FIG. 2 illustrates an asynchronous communication system according to an embodiment of the present disclosure.

FIG. 2 illustrates an asynchronous communication system 200 being implemented within the networked system 100 to provide computer nodes (e.g., the agent devices 180, 190, and 280) access to computing services performed by a processing server 206 that may be remote to the agent devices. As shown in the figure, the asynchronous communication system 200 includes the file sharing server 120, client applications 182, 192, and 282 that are installed and executed on the agent devices 180, 190, and 280, respectively, and a server application 212 installed and executed on the processing server 206.

In some embodiments, the file sharing server 120 is an online file sharing server that facilitates storage and sharing of computer files among multiple users. The file sharing server 120 may include one or more data storages for storing and enabling various devices access to (as referred to as "hosting") computer files. The file sharing server 120 may also host a file structure (e.g., a virtual file structure) within which files associated with different accounts of users can be stored in an organized manner. The file structure may include a hierarchy of computer folders. The file structure enables partitions of computer files associated with different accounts and providing controls and configurable data access for different computer folders by different accounts. For example, an entity who has registered an account with the file sharing server 120 may create additional folders within the file structure, and may configure the folders to be sharable with one or more other accounts. Once a folder is shared among multiple accounts, multiple users may access the folders and perform actions in association with the folders (e.g., uploading files to the folders, downloading files from the folders, deleting files from the folders, etc.) through their accounts. In some embodiments, the file structure, and the files stored within the file structure are stored across multiple data storages accessible by the file sharing server 120. The files may be distributed and/or copied across the multiple data storages (which may be implemented within different computer servers and across multiple geographical locations) to ensure data redundancy and availability. In some embodiments, the file sharing server 120 may be part of a framework within the service provider. In some embodiments, the file sharing server 120 is a third-party server that is operated and maintained by a third-party entity different from the service provider.

The processing server 206 may include components for performing the computing services. In this example, the processing server 206 includes a machine learning model 214 and a machine learning model 216 for performing the computer services. Each of the machine learning models 214 and 216 may be configured to ingest input data and produce output data (e.g., a prediction, an analytical result, etc.). While not shown in this figure, additional modules may also be included in the processing server 206 for performing the computing services. For example, the processing server 206 may also include a data retrieval module for performing data retrieval services. In this example, the processing server 206 may also be communicatively coupled to one or more data sources (e.g., internal and/or external database systems, etc.), and may be configured to retrieve data from the one or more data sources based on a request from any one of the agent devices.

In some embodiments, the server application 212 is configured to facilitate communications for the processing server with the agent devices 180, 190, and 280. As shown in the figure, agent devices 180, 190, and 280 are associated with the service provider server 130, and may be configured to interact with user devices (e.g., the user devices 110, 122, and 126). Since the user devices 110, 122, and 126 may be scattered across different regions, different agent devices may be configured to interact with different user devices based on their regions. In this example, two regions (also referred to as "availability zones") are defined. The two availability zones may be defined based on geographical boundaries (e.g., different cities, different states, different countries, etc.) and/or based on different networks (e.g., different local area networks, different wide area networks, etc.). Depending on the demands, different numbers of agent devices (computer nodes) may be provided in different available zones. In this example, two agent devices 180 and 190 are provided in the availability zone 'A' while one agent device 280 is provided in the availability zone 'B.' Depending on which region a user device is associated with at the time the user device requests interactions (e.g., a chat, a phone call, etc.) with the service provider, a particular agent device within that region will be assigned to service and interact with the user device. As discussed herein, in some embodiments, while interacting with the user devices, the agent devices may require computing services performed by the processing server 206. For example, an agent may request to view a summary of all previous interactions with the same user. In some embodiments, the agents of the agent devices 180, 190, and 280 may also request computing services from the processing server 206 outside of the interactions with user devices. For example, an agent may assist in labeling of certain training data for the machine learning models 214 and 216, and may request the processing server to provide training data for labeling to the agent device.

In some embodiments, instead of generating a complex backend communication framework for facilitating communications between the processing server 206 and the agent devices 180, 190, and 280 across multiple availability zones, the asynchronous communication system 200 may facilitate communications between the process server 206 and the agent devices 180, 190, and 280 by implementing one or more messaging queues via the file sharing server 120. Since file sharing systems are frequently used internally by organizations and service providers to facilitate file transfers among devices and individuals, the infrastructure for using a file sharing system is already present, and no additional hardware or software components are required.

In some embodiments, the server application 212 may register an account with the file sharing server 120. After registering the account with the file sharing server 120, the server application 212 may create one or more folders within the file structure hosted by the file sharing server 120. In this example, the server application 212 creates two folders 242 and 244 hosted by the file sharing server 120. The server application 212 may also configure the folders 242 and 244 to be shared with accounts associated with the client applications 182, 192, and 282, such that the server application 212 may share files with the client applications 182, 192, and 282 (and vice versa) using the folders 242 and 244.

Each of the client applications 182, 192, and 282, included with the corresponding agent device (e.g., the agent device 180, 190, and 280) is configured to facilitate communications for its corresponding agent device with the processing server 206. For example, each of the client applications 182, 192, and 282 may provide an interface that enables an agent (e.g., a human agent, a chatbot, etc.) to initiate a request for computing services. The interface may include a user interface that may be presented on a display of the corresponding agent device, via which the client application may interact with a human agent. The interface may also include an application programming interface (API) for communication with a computer program (e.g., a chatbot, etc.). Via the interface, the client application may receive parameters associated with the request for computing services. For example, the agent 186 may be in a communication session with a user (e.g., a chat session), and may request a summary of previous communication sessions with that same user. In another example, the agent 186 may request a number of training data sets for labeling. Thus, the agent 186 may, via the interface provided by the client application 182, provide the parameters of the request. The client application 182 may generate a request file (e.g., a request file 252) based on the request received from the agent 186, for example, by serializing the request according to a file format (e.g., a text file format, etc.). The client application 182 may upload the request file 252 to a folder shared with the processing server 206 (e.g., the folder 242) within the file sharing server 120 via a file transfer protocol (e.g., SFTP).

The server application 212, in some embodiments, may be configured to monitor the folders 242 and 244 for any new request files. In some embodiments, the server application 212 is configured to monitor the folders 242 and 244 periodically (e.g., every second, every 2 seconds, etc.). In some embodiments, the server application 212 is configured to monitor the folders only when the processing server 206 is idle (not busy performing computing services, etc.). When the server application 212 detects a new request file (e.g., the request file 252), the server application 212 may download the request file 252 from the file sharing server 120 and may then delete the request file 252 from the file sharing server 120. The server application 212 may extract the request from the request file 252, and pass the request to the processing server 206. The processing server 206 may use the machine learning model 214 and/or the machine learning model 216 to perform the computing services based on the request (e.g., based on the parameters included in the request). Based on performing the computing services, the processing server may generate output data (e.g., outputs from the machine learning model 214 and/or the machine learning model 216). The server application 212 may generate a response file (e.g., a response file 254) based on the output data, for example, by serializing the output data according to a file format (e.g., a text file format, etc.). The server application may upload the response file 254 to a folder that is shared with accounts associated with the client application 182 (e.g., the folder 244).

In some embodiments, the client application 182 is configured to monitor the folders (e.g., the folders 242 and 244) for response files. When the client application 182 detects a new response file (e.g., the response file 254) being uploaded to the folder 244 of the file sharing server 120, the client application 182 may determine whether the response file 254 corresponds to the client application 182. If it is determined that the response file 254 corresponds to the client application 182, the client application 182 may download the response file 254 from the file sharing server 120 and deletes the response file 254 from the file sharing server 120. The client application 182 may extract the output data prepared by the processing server 206 from the response file 254. In some embodiments, the client application 182 may present the output data on a display of the agent device 180. In some embodiments, the client application 182 may pass the output data to the computer program (e.g., the chatbot, etc.).

By using the techniques as described herein, the file sharing server 120 that is accessible by the devices (e.g., the agent devices 180, 190, and 280, the processing server 206, etc.) in all of the available zones (e.g., the availability zones 'A' and 'B') is used to implement one or more messaging queues for transmitting request files and response files between the processing server 206 and the agent devices 180, 190, and 280. Since the communication between the processing server 206 and the agent devices 180, 190, and 280 is asynchronous (via the messaging queues), the communication can be facilitated efficiently without taking away crucial computer processing resources from the processing server 206.

Figure 3:
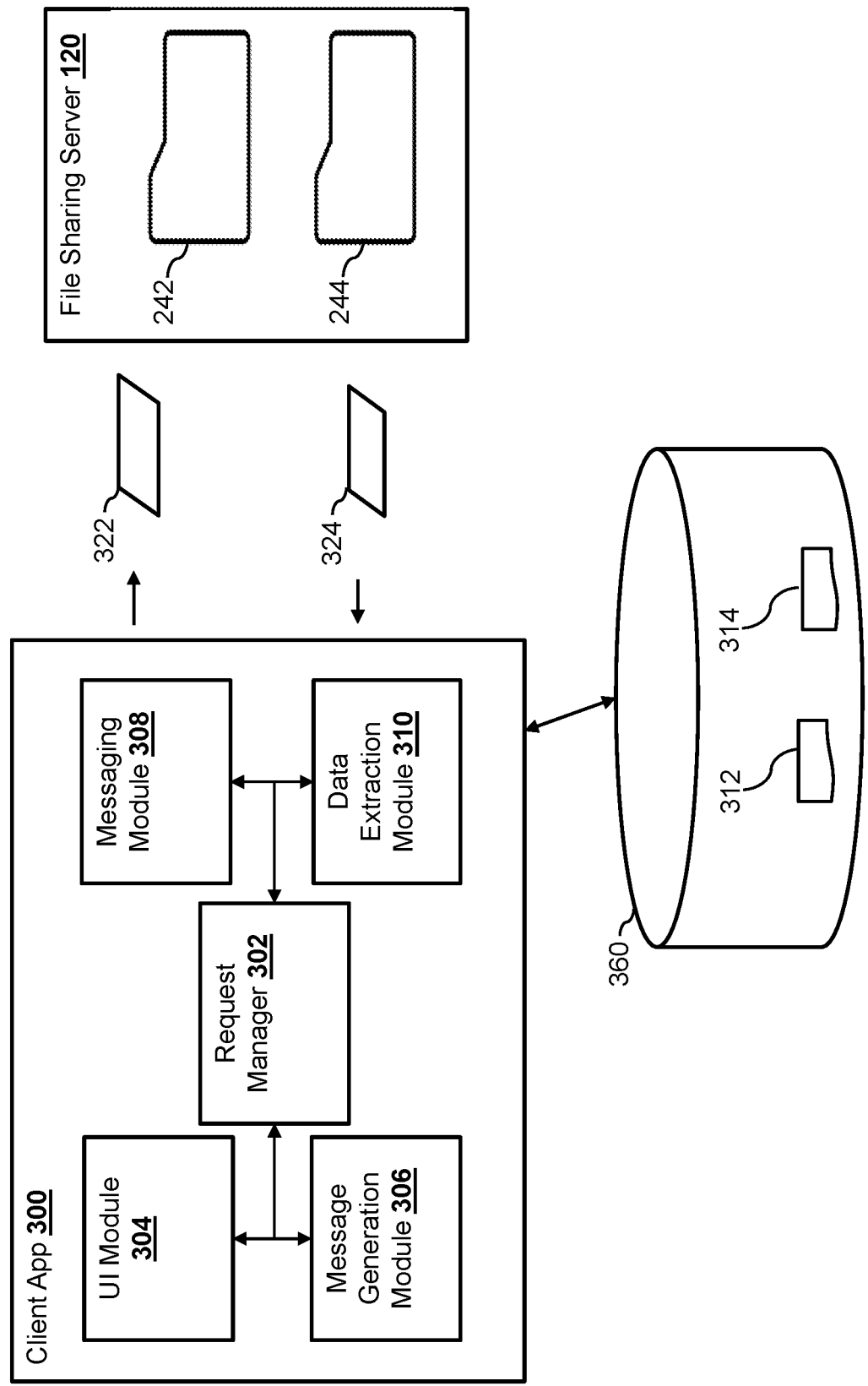
FIG. 3 is a block diagram illustrating a client application according to an embodiment of the present disclosure.

FIG. 3 illustrates an example client application 300, which may be used to implement the client applications 182, 192, and 282. As shown, the client application 300 includes a request manager 302, a user interface module 304, a message generation module 306, a messaging module 308, and a data extraction module 310. When the client application 300 is installed on a device (e.g., an agent device), the client application 300 may establish a connection with the file sharing server 120 and register an account with the file sharing server 120. The client application 300 may also communicate with the server application 206 to notify the server application 216 of its existence. The notification from the client application 300 may include an account identifier associated with the account of the client application 300 with the file sharing serer 120. Transmitting the account identifier to the processing server 206 enables the processing server 206 to share one or more folders (e.g., the folders 242 and 244) hosted by the file sharing server 120 with the client application 300.

In some embodiments, to improve the security of the communications between the processing server 206 and the client application 300, the communication may be encrypted using an asymmetrical encryption technique (e.g., public/private key encryption). Thus, the client application 300 may generate a pair of corresponding private key and public key, and may upload the public key to a folder in the file sharing server 120 that is shared with the processing server 206. The public key associated with the client application 300 may be used by the processing server 206 to encrypt files (e.g., response files) intended for the client application 300. In some embodiments, the client application 300 may also download a public key associated with the processing server 206 from the file sharing server 120.

In some embodiments, the request manager 302 may use the user interface module 304 to provide a user interface on a device on which the client application 300 is installed. Through the user interface, the request manager 302 may receive indications of requests for computing services. For example, an agent may, through the user interface, initiates a request for computing services. The agent may also specify parameters for the request. Based on the parameters received via the user interface, the request manager 302 may use the message generate module 306 to generate a request file 322. The request file 322 may include an identifier associated with the client application 300 (e.g., an account identifier of the client application 300 with the file sharing server 220).

The request file 322 may also include a request for the computing services along with the parameters received from the agent.

In addition, the message generation module 306 may also encrypt at least a portion of the request file 322 using the public key associated with the processing server 206. The messaging module 308 may then upload the request file 322 to a folder (e.g., the folder 242) hosted by the file sharing server 120 via a file transfer protocol (e.g., SFTP).

After uploading the request file 322 to the file sharing server 120, the request manager 302 may monitor the folder 244 for response files. In some embodiments, the request manager 302 may communicate with the file sharing server 120 periodically (e.g., every second, every 3 seconds, etc.) to determine whether a new response file has been uploaded (e.g., by the processing server 206) to the folder 244 hosted by the file sharing serer 120. When a new response file (e.g., the response file 324) is detected in the folder 244, the client application 300 may determine whether the response file 324 corresponds to the client application 300. For example, the client application 300 may check the header of the response file 324 to determine whether the header includes an identifier associated with the client application 300. If the header includes the identifier associated with the client application 300, the client application may download the response file 324 from the file sharing server 120 via the file transfer protocol (e.g., SFTP), and may delete the response file 324 from the file sharing server 120.

The data extraction module 310 may extract output data generated by the processing server 206 from the response file 324. In some embodiments, if the response file 324 has been encrypted by the server application 212 using the public key associated with the client application 300, the data extraction module 310 may first decrypt the response file 324 using the corresponding private key associated with the client application 300 before extracting the output data from the response file 324. The request manager 302 may then present the output data on the user interface. In some embodiments, the request manager 302 may store the decrypted response file 324 in a local data storage (e.g., a data storage 360) along with other response files (e.g., response files 312 and 314, etc.) such that the request manager may provide a user of the client application 300 access to the response file even when a device (e.g., the agent device 180, etc.) on which the client application 300 executes is offline.

Figure 4:
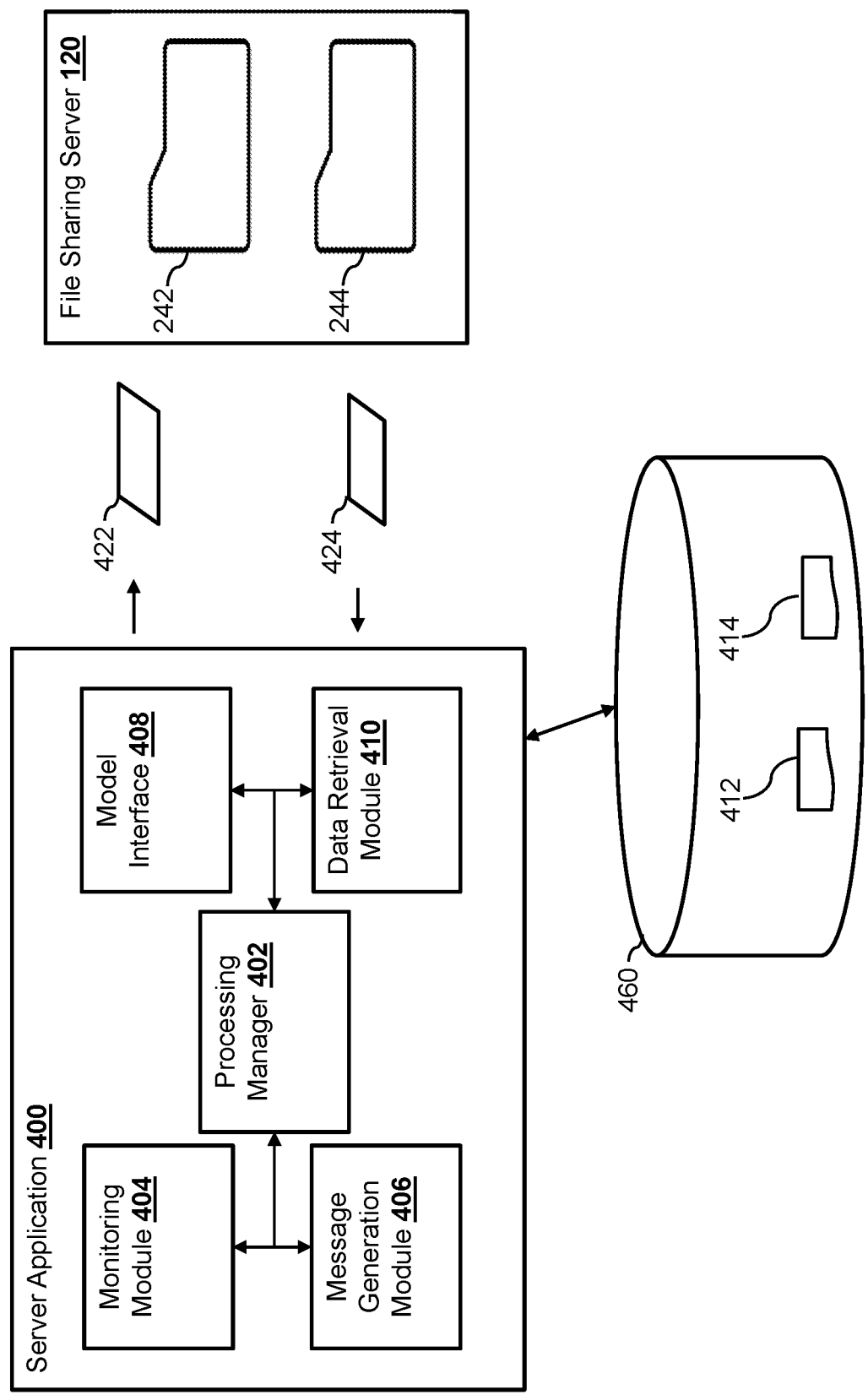
FIG. 4 is a block diagram illustrating a server application according to an embodiment of the present disclosure.

FIG. 4 illustrates an example sever application 400, which may be used to implement the server application 212. As shown, the server application 400 includes a processing manager 402, a monitoring module 404, a message generation module 406, a model interface 408, and a data retrieval module 410. When the server application 400 is executed on a processing server (e.g., the processing server 206) the first time, the processing manager 402 may communicate with the file sharing server 120 to establish an account with the file sharing server 220. The processing manager 402 may create one or more folders within the data structure of the file sharing server 120 through its account. In this example, the processing manger 402 creates two folders 242 and 244. In some embodiments, each folder may be designated with a specific purpose. For example, the folder 242 may be used to store request files submitted by client applications for the processing server 206, and the folder 244 may be used to store response files submitted by the server application 400 for the client applications. In some embodiments, the processing manager 402 may create additional folders, such as a folder for storing public keys associated with the server application and/or the client applications such that the server application and/or the client application can use the public keys to encrypt files intended for other applications. The processing manager 402 may also create another folder for storing statistical data associated with the computing services performed by the processing server 206. The statistical data may then be retrieved by the client applications to be presented to the agents.

In some embodiments, the processing manager 402 may generate a pair of corresponding public key and private key for use in communication with the client applications. The processing manager 402 may then upload the public key to a folder hosted by the file sharing server 120 (e.g., the folder designated for storing public keys of applications). The processing manager 402 may configure the folders to be sharable with different client applications configured to submit requests for computing services to the processing server 206. In some embodiments, as a client application is installed and executed on an agent device, the client application may transmit a notification to the server application 400. The notification may be transmitted to the server application 400 without passing through the file sharing server 120. The notification may include an identifier of the client application, such as an account identifier of the client application with the file sharing server 120. Thus, as the processing manager 402 receives a notification from a client application, the processing manager 402 may configure the folders hosted by the file sharing server 120 (e.g., via an application programming interface of the file sharing server 120) to be shared with the client application, such that the client application may also access content within the folders.

The monitoring module 404 may monitor one or more folders hosted by the file sharing server 120 for new request files submitted by client applications. When a new request file (e.g., a request file 424) is detected in the folder 244, the monitoring module 404 may download the request file 424 from the file sharing server 120 via a file transfer protocol (e.g., SFTP), and may delete the request file 424 from the file sharing server 120. In some embodiments, if the request file 424 has been encrypted using the public key associated with the server application 400, the processing manager 402 may decrypt the request file 424 using the corresponding private key associated with the server application 400 and extract request data (e.g., parameters for performing the computing services, etc.) from the request file 424. The processing manager 402 may store the request file 424 in a data storage 460 associated with the processing server 206, along with other request files (e.g., request files 412 and 414).

The processing manager 402 may determine whether the processing server 206 has enough processing capacity to perform the computing services associated with the request file 424 (e.g., whether the processing server 206 is idling or is busy performing computing services for other requests, etc.). If it is determined that the processing server 206 has enough processing capacity to perform the computing services associated with the request file 424, the processing manager 402 may use the model interface 408 and/or the data retrieval module 410 (or any other module that is configured to perform specific computing services) to perform the computing services specified in the request file 424. For example, the model interface 408 may perform the computing services using one or more machine learning models (e.g., the machine learning model 214 and/or the machine learning model 216). In another example, the data retrieval module 410 may retrieve data (e.g., training data for labeling, etc.) from one or more data sources (e.g., data storages associated with the service provider server 130, etc.) for the request file 424.

Once the computing services are completed, the message generation module 406 may generate a response file 422 based on the output data from performing the computing services. For example, the output data may include outputs (e.g., a prediction, etc.) from the machine learning model 214 and/or the machine learning model 216. In another example, the output data may include data retrieved from the one or more data sources. The request file may also include the identifier of the client application that submitted the request file 424 (e.g., an account identifier with the file sharing server 120, etc.). In some embodiments, the message generation module 406 may retrieve the public key of the client application that submitted the request file 424 (e.g., from a folder hosted by the file sharing server 120), and encrypt at least a portion of the response file 422 (e.g., excluding the identifier of the client application). The processing manager 402 may then upload the response file 422 to the file sharing server (e.g., the folder 242 hosted by the file sharing server 220) via the file transfer protocol.

FIG. 5 illustrates an example request message 500 that can be included in a request file submitted to the processing server 206. In this example, the message 500 is for a request to retrieve training data for labeling. As such, the message 500 may include parameters such as the start date and the end date of the data records, the countries from which the data records were created, the languages used in the data records, and other parameters.

Figure 6:
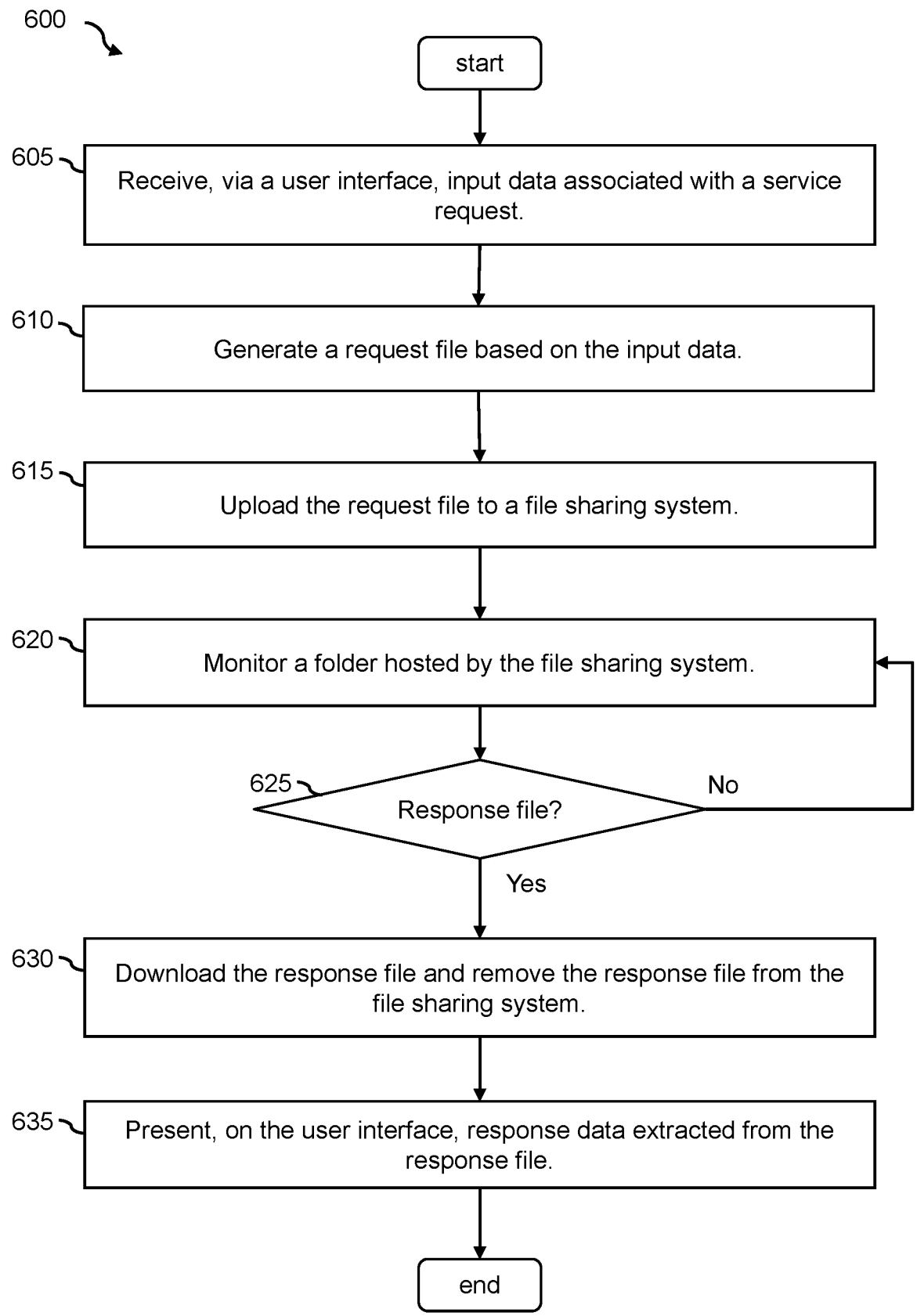
FIG. 6 is a flowchart showing a process of facilitating communication with a processing server for a client application according to an embodiment of the present disclosure.

FIG. 6 illustrates a process 600 for facilitating requests for computing services for a computer node according to various embodiments of the disclosure. In some embodiments, at least a portion of the process 600 may be performed by a client application (e.g., the client applications 182, 192, 282, and 300). The process 600 begins by receiving (at step 605), via a user interface, input data associated with a service request. For example, the user interface module 304 of the client application 300 may receive an indication for initiating a request for certain computing services, via an interface provided on an agent device. The client application 300 may also receive parameters that can be used by the processing server 206 to perform the computing services.

The process 600 then generates (at step 610) a request file based on the input data and uploads (at step 615) the request file to a file sharing system. For example, the message generation module 306 may generate a request file based on the parameters received via the user interface. The request file may include an identifier of the client application 300 and the parameters for the computing services. In some embodiments, the message generation module 306 may also encrypt at least part of the request file using the public key associated with the server application. The messaging module 308 may then upload the request file to a folder hosted by the file sharing server 220.

After uploading the request file, the process 600 monitors (at step 620) a folder hosted by the file sharing system and determines (at step 625) whether a response file has been uploaded to the folder. If no response file has been uploaded to the folder, the process 600 reverts back to the step 620 to continue monitoring the folder. For example, the messaging module 308 may monitor the folder hosted by the file sharing server 220 for any new response files that have been uploaded by the server application. If no response file exists in the folder, the messaging module 308 may continue to monitor the folder.

On the other hand, if a response file is detected in the folder, the process 600 downloads (at step 630) the response file and removes the response file from the file sharing system, and presents (at step 635), on the user interface, response data extracted from the response file. For example, if the messaging module 308 determines that a new response file has been uploaded to the folder, the messaging module 308 may download the response file from the file sharing server 220 and deletes the copy of the response file from the file sharing server 220. If the response file was encrypted using the public key associated with the client application, the data extraction module 310 may decrypt the response file using the private key associated with the client application 300. The data extraction module 310 may also extracts output data from the response file. The request manager 302 may then present the output data on the user interface displayed on the agent device.

Figure 7:
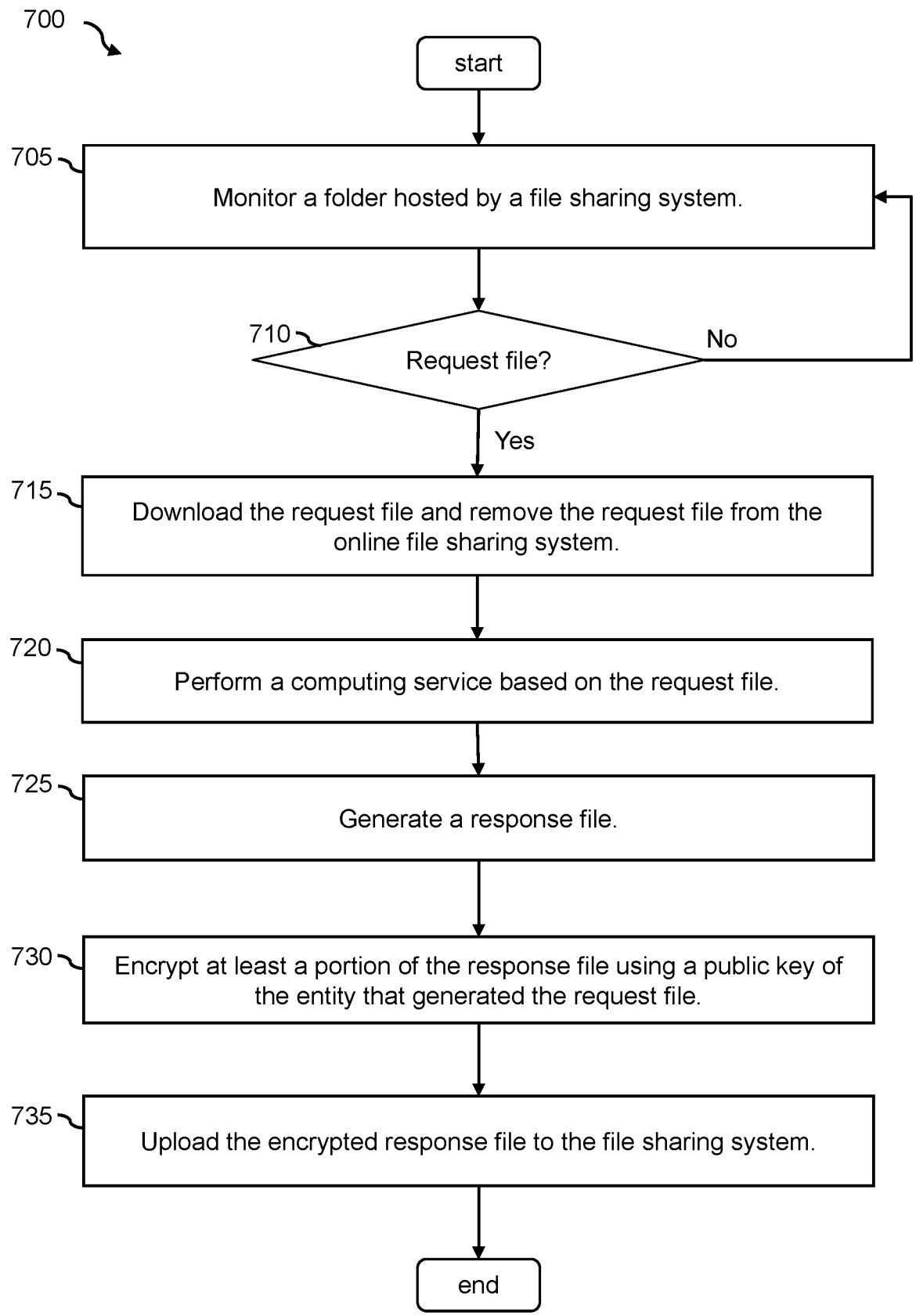
FIG. 7 is a flowchart showing a process of facilitating communication with client applications for a processing server according to an embodiment of the present disclosure.

FIG. 7 illustrates a process 700 for facilitating requests for computing services for a processing server according to various embodiments of the disclosure. In some embodiments, at least a portion of the process 700 may be performed by a server application (e.g., the server application 212 and 400). The process 700 begins by monitoring (at step 705) a folder hosted by a file sharing system and determines (at step 710) whether a request file has been uploaded to the folder. If no request file has been uploaded to the folder, the process 700 reverts back to the step 705 to continue monitoring the folder. For example, the monitoring module 404 may monitor a folder hosted by the file sharing server 220 for any new request files that have been uploaded by a client application. If no request file exists in the folder, the monitoring module 404 may continue to monitor the folder.

On the other hand, if a request file is detected in the folder, the process 700 downloads (at step 715) the request file and removes the request file from the file sharing system 220. For example, if the monitoring module 404 determines that a new request file has been uploaded to the folder, the monitoring module 404 may download the request file from the file sharing server 220 and deletes the copy of the request file from the file sharing server 220.

The process 700 then performs (at step 720) a computing service based on the request file and generates (at step 725) a response file. For example, the processing manager 402 may extract request data from the request file. If the request file is encrypted using the public key associated with the server application 400, the processing manager 402 may decrypt the request file using the corresponding private key associated with the server application 400 before extracting the request data from the request file. The processing manager 402 may use the model interface 408, the data retrieval module 410 and/or other modules for performing the computing services based on the request data. The performance of the computing services may generate output data. In some embodiments, the message generation module 406 may generate a response file based on the output data.

The process 700 encrypts (at step 730) at least a portion of the response file using a public key of the entity that generated the request file and uploads (at step 735) the encrypted response file to the file sharing system. For example, the message generation module 406 may encrypt at least a portion of the response file (e.g., excluding the identifier of the client application) using a public key associated with the client application that submitted the request file. The processing manager 402 may upload the response file to the file sharing system 120 such that the client application may access the output data.

FIG. 8 is a block diagram of a computer system 800 suitable for implementing one or more embodiments of the present disclosure, including the service provider server 130, the processing server 206, the user devices 110, 122, and 126, the file sharing server 120, and the agent devices 180, 190, and 280. In various implementations, the user devices 110, 122, and 126, and the agent devices 180, 190, and 280 may include a mobile cellular phone, personal computer (PC), laptop, wearable computing device, etc. adapted for wireless communication, and each of the service provider server 130, the processing server 206, and the file sharing server 120 may include a network computing device, such as a server. Thus, it should be appreciated that the devices/servers 110, 120, 122, 126, 130, 180, 190, 206, and 280 may be implemented as the computer system 800 in a manner as follows.

The computer system 800 includes a bus 812 or other communication mechanism for communicating information data, signals, and information between various components of the computer system 800. The components include an input/output (I/O) component 804 that processes a user (i.e., sender, recipient, service provider) action, such as selecting keys from a keypad/keyboard, selecting one or more buttons or links, etc., and sends a corresponding signal to the bus 812. The I/O component 804 may also include an output component, such as a display 802 and a cursor control 808 (such as a keyboard, keypad, mouse, etc.). The display 802 may be configured to present a login page for logging into a user account or a checkout page for purchasing an item from a merchant. An optional audio input/output component 806 may also be included to allow a user to use voice for inputting information by converting audio signals. The audio I/O component 806 may allow the user to hear audio. A transceiver or network interface 820 transmits and receives signals between the computer system 800 and other devices, such as another user device, a merchant server, or a service provider server via a network 822, such as network 160 of FIG. 1. In one embodiment, the transmission is wireless, although other transmission mediums and methods may also be suitable. A processor 814, which can be a micro-controller, digital signal processor (DSP), or other processing component, processes these various signals, such as for display on the computer system 800 or transmission to other devices via a communication link 824. The processor 814 may also control transmission of information, such as cookies or IP addresses, to other devices.

The components of the computer system 800 also include a system memory component 810 (e.g., RAM), a static storage component 816 (e.g., ROM), and/or a disk drive 818 (e.g., a solid-state drive, a hard drive). The computer system 680 performs specific operations by the processor 814 and other components by executing one or more sequences of instructions contained in the system memory component 810. For example, the processor 814 can perform the asynchronous communication functionalities described herein according to the processes 600 and 700.

Logic may be encoded in a computer readable medium, which may refer to any medium that participates in providing instructions to the processor 814 for execution. Such a medium may take many forms, including but not limited to, non-volatile media, volatile media, and transmission media. In various implementations, non-volatile media includes optical or magnetic disks, volatile media includes dynamic memory, such as the system memory component 810, and transmission media includes coaxial cables, copper wire, and fiber optics, including wires that comprise the bus 812. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 800. In various other embodiments of the present disclosure, a plurality of computer systems 800 coupled by the communication link 824 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A method, comprising:
monitoring, by one or more hardware processors of a computer server, a first folder of a file sharing system, wherein the first folder is shared with a plurality of devices associated with a plurality of availability zones;

detecting, by the one or more hardware processors, that a first computer file has been uploaded to the first folder hosted by the file sharing system;
downloading, by the one or more hardware processors, the first computer file to the computer server;
subsequent to the downloading, removing, by the one or more hardware processors, the first computer file from the file sharing system;
extracting, by the one or more hardware processors, a service request from the first computer file;
generating, by the one or more hardware processors, response data for the service request based on performing a service corresponding to the service request;
determining, by the one or more hardware processors, an identity of a client application that uploaded the first computer file to the first folder;
attaching, by the one or more hardware processors, the identity to the response data;
retrieving, by the one or more hardware processors from the file sharing system, a public key associated with the client application;
encrypting, by the one or more hardware processors using the public key, a portion of the response data, but not the identity attached to the response data;
generating, by the one or more hardware processors, a second computer file based on serializing the response data; and
uploading, by the one or more hardware processors, the second computer file to a second folder hosted by the file sharing system.

2. The method of claim 1, further comprising:
determining data based on service requests received from a plurality of client applications across the plurality of availability zones via the file sharing system; and
publishing the data via the file sharing system.

3. The method of claim 1, wherein the performing the service comprises retrieving training data.

4. The method of claim 1, wherein the service is performed using a machine learning model.

5. The method of claim 1, further comprising:
downloading a third computer file from the first folder of the file sharing system;
determining a second identity of a second client application that uploaded the third computer file to the first folder;
generating a fourth computer file based at least in part on the second identity; and
uploading the fourth computer file to the second folder hosted by the file sharing system.

6. The method of claim 5, further comprising:
retrieving, from the file sharing system, a second public key associated with the second client application, wherein the generating the fourth computer file comprises (i) generating second response data based on performing a second service associated with a second service request included in the third computer file and (ii) encrypting a portion of the second response data using the second public key.

7. The method of claim 1, wherein the first computer file is encrypted using a server public key associated with the computer server, and wherein the method further comprises:
decrypting the first computer file using a server private key associated with the computer server.

8. A non-transitory machine-readable medium having stored thereon machine-readable instructions executable to cause a computer server to perform operations comprising:

detecting that a first computer file has been uploaded to a first folder hosted by a file sharing system;
extracting a service request from the first computer file;
performing a service based on the service request;
generating response data based on a result from the performing the service;
determining a first identity of a first client application that uploaded the first computer file to the first folder;
inserting the first identity into the response data;
generating partially encrypted response data based on encrypting a portion of the response data, but not the first identity inserted into the response data;
generating a second computer file based on serializing the partially encrypted response data;
uploading the second computer file to a second folder hosted by the file sharing system;
detecting that a third computer file has been uploaded to the first folder hosted by the file sharing system;
determining a second identity of a second client application that uploaded the third computer file to the first folder;
generating a fourth computer file based at least in part on the second identity; and
uploading the fourth computer file to the second folder hosted by the file sharing system.

9. The non-transitory machine-readable medium of claim 8, wherein the first folder is shared with a plurality of devices associated with a plurality of availability zones.

10. The non-transitory machine-readable medium of claim 9, wherein the operations further comprise:
determining data based on service requests received from a plurality of client applications across the plurality of availability zones via the file sharing system; and
publishing the data via the file sharing system.

11. The non-transitory machine-readable medium of claim 8, wherein the first computer file is encrypted using a public key associated with the computer server, and wherein the operations further comprise:
decrypting the first computer file using a private key associated with the computer server.

12. The non-transitory machine-readable medium of claim 8, wherein the operations further comprise:
retrieving, from the file sharing system, a public key associated with the client application, wherein the encrypting the portion of the response data is performed using the public key.

13. The non-transitory machine-readable medium of claim 8, wherein the service is performed using a machine learning model.

14. A system, comprising:
a non-transitory memory; and
one or more hardware processors coupled with the non-transitory memory and configured to read instructions from the non-transitory memory to cause the system to perform operations comprising:
monitoring a first folder of a file sharing system, wherein the first folder is shared with a plurality of devices associated with a plurality of availability zones;
detecting that a first computer file has been uploaded to the first folder;
extracting a service request from the first computer file;
removing the first computer file from the file sharing system;
generating response data for the service request based on performing a service corresponding to the service request;

determining an identity of a client application that uploaded the first computer file to the first folder;

attaching the identity to the response data;

retrieving, from the file sharing system, a public key associated with the client application;

generating, using the public key, partially encrypted response data based on encrypting a portion of the response data, but not the identity attached to the response data;

generating a second computer file based on serializing the partially encrypted response data; and uploading the second computer file to a second folder of the file sharing system.

15. The system of claim 14, wherein the operations further comprise:

determining data based on service requests received from a plurality of client applications across the plurality of availability zones via the file sharing system; and publishing the data via the file sharing system.

16. The system of claim 14, wherein the performing the service comprises retrieving training data.

17. The system of claim 14, wherein the service is performed using a machine learning model.

18. The system of claim 14, wherein the operations further comprise:

downloading a third computer file from the first folder of the file sharing system;

determining a second identity of a second client application that uploaded the third computer file to the first folder;

generating a fourth computer file based at least in part on the second identity; and uploading the fourth computer file to the second folder of the file sharing system.

19. The system of claim 18, wherein the operations further comprise:

retrieving, from the file sharing system, a second public key associated with the second client application, wherein the generating the fourth computer file comprises (i) generating second response data based on performing a second service associated with a second service request included in the third computer file and (ii) encrypting a portion of the second response data using the second public key.

20. The system of claim 14, wherein the first computer file is encrypted using a server public key associated with the system, and wherein the operations further comprise:

decrypting the first computer file using a server private key associated with the system.

* * * * *